(12) United States Patent
Sulzbach et al.

(10) Patent No.: US 7,192,478 B2
(45) Date of Patent: Mar. 20, 2007

(54) FATTY (METH) ACRYLATES AND THEIR USE IN DISPERSING PIGMENTS

(75) Inventors: Horst Sulzbach, Duesseldorf (DE); Alfred Westfechtel, Hilden (DE); Lars Zander, Duesseldorf (DE); Rainer Hoefer, Duesseldorf (DE); Matthias Fies, Krefeld (DE)

(73) Assignee: Cognis Deutschland GmbH & Co. KG, Duesseldorf (DE)

( * ) Notice: Subject to any disclaimer, the term of this patent is extended or adjusted under 35 U.S.C. 154(b) by 156 days.

(21) Appl. No.: 10/473,100

(22) PCT Filed: Mar. 19, 2002

(86) PCT No.: PCT/EP02/02995

§ 371 (c)(1),
(2), (4) Date: Feb. 24, 2004

(87) PCT Pub. No.: WO02/079331

PCT Pub. Date: Oct. 10, 2002

(65) Prior Publication Data

US 2004/0129179 A1    Jul. 8, 2004

(30) Foreign Application Priority Data

Mar. 28, 2001  (DE)  ............... 101 15 300

(51) Int. Cl.
*C08K 5/00*   (2006.01)

(52) U.S. Cl. .................................... 106/499

(58) Field of Classification Search ................. 106/499
See application file for complete search history.

(56) References Cited

U.S. PATENT DOCUMENTS

| | | | |
|---|---|---|---|
| 3,125,592 A | | 3/1964 | Nevin |
| 4,119,640 A | * | 10/1978 | Hodakowski et al. ....... 549/546 |
| 4,238,573 A | * | 12/1980 | Hamilton .................... 525/110 |
| 4,542,192 A | * | 9/1985 | Kraft et al. .................. 525/438 |
| 5,292,833 A | * | 3/1994 | Grahe et al. ................. 525/531 |
| 5,324,846 A | * | 6/1994 | Hirshman et al. .......... 554/121 |
| 5,336,313 A | | 8/1994 | Bunte et al. |
| 5,688,598 A | * | 11/1997 | Keck et al. .................. 428/458 |
| 6,051,353 A | * | 4/2000 | Hoffend et al. ........... 430/111.1 |
| 6,121,398 A | * | 9/2000 | Wool et al. ............... 526/238.1 |
| 6,180,691 B1 | * | 1/2001 | Cheng et al. ............... 523/160 |
| 6,358,659 B1 | * | 3/2002 | Foucher et al. ......... 430/111.35 |
| 6,653,381 B2 | * | 11/2003 | Thames et al. ............. 524/398 |
| 6,897,255 B1 | * | 5/2005 | Thames et al. ............. 524/398 |

FOREIGN PATENT DOCUMENTS

| | | |
|---|---|---|
| DE | 195 12 551 A1 | 10/1996 |
| EP | 0 610 534 B1 | 8/1994 |
| GB | 1 407 898 A | 10/1975 |
| WO | WO 00/17250 A1 | 3/2000 |

OTHER PUBLICATIONS

Neumüller, "Römpps Chemie-Lexikon", Stuttgart, (1974), pp. 2693-2695, not translated from German.

* cited by examiner

*Primary Examiner*—J. A. Lorengo
*Assistant Examiner*—Jennine Brown
(74) *Attorney, Agent, or Firm*—John F. Daniels; Jane E. Alexander

(57) ABSTRACT

Fatty (meth)acrylates having a %-EpO content of below 0.6, which are reaction products of epoxidized compounds selected from the group consisting of epoxidized fatty acid esters, epoxidized triglycerides and mixtures thereof, and acids selected from the group consisting of acrylic acid, methacrylic acid and mixtures thereof, wherein the %-EpO content of the epoxidized compound is above 6.4, wherein the epoxidized compound is an epoxidation product of fatty acid moieties having one or more carbon-carbon double bonds, wherein less than 20 mole % of the fatty acid moieties contain three or more carbon-carbon double bonds, and wherein greater than 60 mole % of the fatty acid moieties contain two carbon-carbon double bonds are useful as pigment dispersants. Pigment dispersant concentrates, aqueous pigment dispersions and methods of dispersing pigments with the fatty (meth)acrylates are described.

20 Claims, No Drawings

FATTY (METH) ACRYLATES AND THEIR USE IN DISPERSING PIGMENTS

BACKGROUND OF THE INVENTION

Dispersants are substances which facilitate the dispersion of particles in a medium by reducing the interfacial tension between the two components. Dispersants are generally surfactants of anionic, cationic and nonionic structure. A dispersant significantly reduces the work involved in dispersion. Under the effect of mutual attraction forces, dispersed solids can tend to re-agglomerate after the dispersion process. The use of dispersants also counteracts the tendency of the solids to re-agglomerate. The dispersant used has to meet particularly stringent requirements in the dispersion of pigments, such as colored or magnetic pigments. Inadequate dispersion is reflected in an increase in the viscosity of liquid systems, in losses of brilliance and in changes of shade.

Particularly good dispersion of the colored pigment is required in the case of inks for use in inkjet printers (inkjet inks) in order to guarantee unhindered passage of the colored pigment particles through the jets of the printing head which are often only a few micrometers in diameter. In addition, the pigment particles have to be prevented from agglomerating and thus blocking the printer jets in those periods when the printer is not in operation.

Particularly good dispersion of the colored pigments is also important in the coating of hard surfaces.

EP-B-610 534 describes modified copolymers as pigment dispersants for water-based coating compositions.

WO 00/17250 describes dispersants obtained by reaction of isocyanates with certain polymeric compounds terminated at one end of the chain by special reactive groups.

BRIEF SUMMARY OF THE INVENTION

The present invention relates, in general, to the use of fatty (meth)acrylates for dispersing pigments.

The problem addressed by the present invention was to provide substances that would be suitable for dispersing pigments. Pigments are generally known among experts to be substances which are largely insoluble in solvents or binders and which are organic or inorganic, colored or uncolored coloring agents. This definition is taken from Römpps Chemie-Lexikon, Stuttgart 1974, pp.2693–2695.

Another problem addressed by the invention was to ensure that the substances suitable for dispersing pigments would be pourable at 23° C. More particularly, these substances would be distinguished by a Brookfield viscosity of less than 30,000 mPas and preferably less than 20,000 mPas (as measured at 23° C.) so that they would be easy to handle, i.e. in particular would be pourable and/or pumpable by virtue of their relatively low viscosity.

The problem stated above has surprisingly been solved by fatty (meth)acrylates obtainable by reaction of epoxidized fatty acid esters and/or epoxidized triglycerides with acrylic acid and/or methacrylic acid, the reaction being conducted in such a way that the %-EpO content of the fatty (meth) acrylates is below 0.6 and the following conditions applying to the epoxidized fatty acid esters and/or epoxidized triglycerides on which the fatty (meth)acrylates are based:
  a) the %-EpO content of the epoxidized fatty acid esters and/or epoxidized triglycerides used is above 6.4;
  b) less than 20 mol-% of the fatty acid units on which the epoxidized fatty acid esters and/or epoxidized triglycerides are based contain three or more C=C double bonds per fatty acid unit;
  c) more than 60 mol-% of the fatty acid units on which the epoxidized fatty acid esters and/or epoxidized triglycerides are based contain two C=C double bonds per fatty acid unit.

Accordingly, the present invention relates to the use of fatty (meth)acrylates for dispersing pigments, the fatty (meth)acrylates being obtainable by reaction of epoxidized fatty acid esters and/or epoxidized triglycerides with acrylic acid and/or methacrylic acid, the reaction being conducted in such a way that the %-EpO content of the fatty (meth) acrylates is below 0.6 and the following conditions applying to the epoxidized fatty acid esters and/or epoxidized triglycerides on which the fatty (meth)acrylates are based:
  d) the %-EpO content of the epoxidized fatty acid esters and/or epoxidized triglycerides used is above 6.4;
  e) less than 20 mol-% of the fatty acid units on which the epoxidized fatty acid esters and/or epoxidized triglycerides are based contain three or more C=C double bonds per fatty acid unit;
  f) more than 60 mol-% of the fatty acid units on which the epoxidized fatty acid esters and/or epoxidized triglycerides are based contain two C=C double bonds per fatty acid unit.

DETAILED DESCRIPTION OF THE INVENTION

Suitable pigments are any of the substances known to the pigment expert. In the context of the present invention, these include in particular the special pigments mentioned in the cited section of the Römmp Chemie-Lexikon (see above). Besides colored pigments, the definition of the pigments does of course also encompass white pigments, black pigments and magnetic pigments.

Fatty (meth)acrylates in the context of the present invention are understood to include fatty acrylates and fatty methacrylates. According to the invention, fatty acrylates and fatty methacrylates may be used both as individual substances and in admixture with one another. Both mixtures of fatty acrylates and mixtures of fatty methacrylates may be used. Mixtures containing both fatty acrylates and fatty methacrylates may also be used.

Condition a)

The epoxide value (% EpO content) known to the expert indicates how many grams of oxirane oxygen are present in 100 grams of a sample. The epoxide value is determined by titration. Reference is specifically made in this connection to the Examples where the method of measurement to be used in accordance with the invention is described in detail.

In one embodiment, the %-EpO content of the epoxidized fatty acid esters and/or epoxidized triglycerides used is above 7.0.

Condition b)

In one embodiment, less than 10 mol-% of the fatty acid units on which the epoxidized fatty acid esters and/or epoxidized triglycerides are based contain three or more C=C double bonds per fatty acid unit.

In a preferred embodiment, less than 5 mol-% of the fatty acid units on which the epoxidized fatty acid esters and/or epoxidized triglycerides are based contain three or more C=C double bonds per fatty acid unit.

Condition c)

In one embodiment, more than 65 mol-% of the fatty acid units on which the epoxidized fatty acid esters and/or epoxidized triglycerides are based contain two C=C double bonds per fatty acid unit.

In a preferred embodiment, more than 70 mol-% of the fatty acid units on which the epoxidized fatty acid esters and/or epoxidized triglycerides are based contain two C=C double bonds per fatty acid unit.

An optional embodiment of the invention is characterized in that less than 20 mol-% and preferably less than 10 mol-% of the fatty acid units on which the epoxidized fatty acid esters and/or epoxidized triglycerides are based are free from C=C double bonds in the respect that these fatty acid units are saturated fatty acids.

Production of the Fatty (meth)acrylates

As already mentioned, the fatty (meth)acrylates to be used in accordance with the invention are obtainable by reaction of epoxidized fatty acid esters and/or epoxidized triglycerides with acrylic acid and/or methacrylic acid. The %-EpO content of the fatty (meth)acrylates should be adjusted to values below 0.6.

Where epoxidized fatty acid esters and/or epoxidized triglycerides are reacted with acrylic acid and/or methacrylic acid for the production of the fatty (meth)acrylates according to the invention, the condition mentioned means that the oxirane rings present in the starting materials, i.e. the epoxidized fatty acid esters and/or epoxidized triglycerides, are largely ring-opened. The oxirane rings are preferably opened substantially quantitatively.

The production of epoxidized fatty acid esters or epoxidized triglycerides has been known for some time. To this end, esters of olefinically unsaturated fatty acids or triglycerides which contain olefinically unsaturated fatty acids as fatty acid units are subjected to epoxidation, one or more double bonds per molecule being converted into oxirane groups.

Preferred fatty acid units of the fatty acid esters to be epoxidized are $C_{12-24}$ carboxylic acids which contain at least one olefinic double bond in the molecule. Preferred triglycerides to be epoxidized are triglycerides in which at least one fatty acid unit per triglyceride molecule contains at least one olefinic double bond.

Examples of suitable epoxidized triglycerides are the epoxidation products of the following unsaturated oils: linola oil, hemp oil, globe thistle oil.

Production is carried out in particular by reaction of the unsaturated oils mentioned with performic or peracetic acid.

The addition of acrylic and/or methacrylic acid onto the epoxidized fatty acid esters or epoxidized triglycerides mentioned is known per se to the expert. According to the present invention, it should be carried out in such a way that the %-EpO content of the fatty (meth)acrylates is below 0.6. As already mentioned, however, the addition of the acrylic and/or methacrylic acid onto the epoxidized fatty acid esters or epoxidized triglycerides mentioned in a particularly preferred embodiment is carried out in such a way that more or less all oxirane rings are opened and converted into HO—CH$_2$—CH$_2$—OR groups in which R is an acrylate or methacrylate group.

Pigment Concentrates

The present invention also relates to pigment concentrates. These pigment concentrates consist of 0.1 to 70% by weight of one or more pigments,
0.1 to 30% by weight of one or more fatty (meth)acrylates,
0 or 15 to 85% by weight of a liquid carrier medium.

The total of all the constituents together must of course come to 100% by weight.

The liquid carrier medium may be an organic carrier oil or water. Carrier media such as these are familiar to the expert. If the carrier medium is water, an organic solvent and/or a surfactant is additionally used. Suitable solvents are any organic solvents known to the expert. The solvents typically used in water-based coating compositions are preferably used.

The embodiments in which the pigment concentrates consist solely of the first two components mentioned, i.e. are free from a liquid carrier medium, are used in paste form.

In one embodiment, the pigment concentrates are water-containing systems and consist of:

0.1 to 70% by weight of one or more pigments,
0.1 to 30% by weight of one or more fatty (meth) acrylates,
15 to 85% by weight of water,
0 or 0.1 to 20% by weight of solvents,
0 or 0.1 to 20% by weight of surfactants.

The sum total of the last two components mentioned must not be 0. These systems are also pigment concentrates but, in this special embodiment, may also be referred to as aqueous pigment dispersions.

The pigment concentrates according to the invention are particularly suitable for incorporation in water-based coating compositions.

EXAMPLES

A) Methods of Measurement

% EpO: The content of oxirane groups ("epoxide groups") in compounds was characterized by epoxide titration. The epoxide value (% EpO) obtained indicates how many grams of oxirane oxygen are present in 100 grams of a sample.

Titration is based on the following principle: A solution containing excess tetraethyl ammonium bromide is added to the sample containing oxirane rings. The mixture is then titrated with a solution of perchloric acid in glacial acetic acid, an equimolar quantity of hydrogen bromide being released. The hydrogen bromide reacts with the oxirane rings which are opened and forms the corresponding bromohydrin.

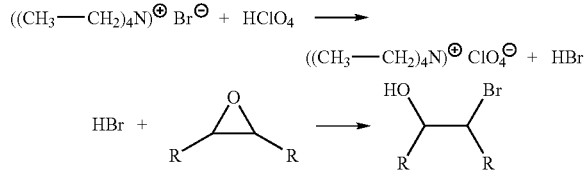

Crystal violet is used as the indicator. The determination presupposes the absence of water, bases and amines.

The following reactants were used: (1) 0.1 N-perchloric acid (Merck) in glacial acetic acid; (2) tetraethyl ammonium bromide (Fluka) in the form of a solution of 100 g tetraethyl ammonium bromide in 400 ml glacial acetic acid; (3) crystal violet (Merck); to prepare the indicator solution, 0.2 g crystal violet was dissolved in 100 ml glacial acetic acid.

Procedure: 0.2 to 0.5 g of the sample containing oxirane rings was introduced into an Erlenmeyer flask. The sample was dissolved in 50 ml anhydrous acetone. 10 ml tetraethyl ammonium bromide solution (see above)

and 3 drops of crystal violet solution (see above) were then added. The mixture is titrated with a 0.1 N solution of perchloric acid in glacial acetic acid. The end point is reached when the color changes from blue to green.

Before the actual titration, a blank test is carried out (no oxirane compound present) in order to rule out measurement errors.

Evaluation: The epoxide content % EpO is calculated as follows:

% $EpO = [(a-b)*0.160]/E$ a:=milliliters of 0.1 n $HClO_4$ solution needed for titration
b:=milliliters of 0.1 n $HClO_4$ solution needed in the blank test
E:=sample weight in grams B) Preparation and Testing of Fatty Acrylates

TABLE 1 characteristics of the oils used

| | | Fatty acid spectrum* | | | |
|---|---|---|---|---|---|
| | Iodine value | 16:0 + 18:0 | 18:1 | 18:2 | 18:3 |
| Soybean oil | 130 | 19 | 21 | 53 | 7 |
| Linseed oil | 180 | 10 | 17 | 14 | 59 |
| Hemp oil | 162 | 9 | 12 | 56 | 21 |
| Linola oil | 140 | 10 | 16 | 72 | 2 |

*as known to the expert, the number before the colon indicates the chain length (number of C atoms) while the number after the colon indicates the number of C═C double bonds In order to obtain good material properties, epoxidized fats and oils with the maximum possible oxirane content were used. In the case of epoxidized linseed oil and hemp oil, this amounted to ca. 8.2% EpO because, with higher contents, solidification occurs. The epoxide content for epoxidized linola oil was ca. 7.1% EpO and, for epoxidized soybean oil, ca. 6.5% EpO.

Comparison Example 1

Soybean Oil Acrylate (C 1)

465 g acrylic acid were added dropwise to a mixture of 1636 g soybean oil epoxide (% EpO=6.3), 30 g triethylamine and 6,000 ppm hydroquinone methyl ether (MEHQ) with vigorous stirring under nitrogen over a period of 10 hours at 130° C. The reaction was terminated when the acid value fell below 50. The product had a % EpO value of 0.4.

Comparison Example 2

Linseed Oil Acrylate (C 2)

394 g acrylic acid were added dropwise to a mixture of 1000 g linseed oil epoxide (% EpO=8.5), 30 g triethylamine and 6,000 ppm MEHQ with vigorous stirring under nitrogen over a period of 10 hours at 130° C. The reaction was terminated when the acid value fell below 50. The product had a % EpO value of 0.5.

Example 1

Linola Oil Acrylate (E 1)

382 g acrylic acid were added dropwise to a mixture of 1195 g linola oil epoxide (epoxide value=7.1), 30 g triethylamine and 6,000 ppm MEHQ with vigorous stirring under nitrogen over a period of 10 hours at 130° C. The reaction was terminated when the acid value fell below 50. The product had a % EpO value of 0.4.

What is claimed is:

1. A method comprising:
   (a) providing a pigment;
   (b) providing a fatty (meth)acrylate having an epoxide value of below 0.6, wherein the fatty (meth)acrylate is a product of a process comprising reacting an epoxidized compound selected from the group consisting of epoxidized fatty acid esters, epoxidized triglycerides and mixtures thereof, with an acid selected from the group consisting of acrylic acid, methacrylic acid and mixtures thereof, wherein the epoxide value of the epoxidized compound is above 6.4, wherein the epoxidized compound is an epoxidation product of fatty acid moieties having one or more carbon-carbon double bonds, wherein less than 20 mole % of the fatty acid moieties contain three or more carbon-carbon double bonds, and wherein greater than 60 mole % of the fatty acid moieties contain two carbon-carbon double bonds; and
   (c) combining the pigment and the fatty (meth)acrylate in a liquid carrier medium.

2. The method according to claim 1, wherein the epoxide value of the epoxidized compound is above 7.0.

3. The method according to claim 1, wherein less than 10 mole % of the fatty acid moieties contain three or more carbon-carbon double bonds.

4. The method according to claim 2, wherein less than 10 mole % of the fatty acid moieties contain three or more carbon-carbon double bonds.

5. The method according to claim 1, wherein less than 5 mole % of the fatty acid moieties contain three or more carbon-carbon double bonds.

6. The method according to claim 1, wherein greater than 65 mole % of the fatty acid moieties contain two carbon-carbon double bonds.

7. The method according to claim 2, wherein greater than 65 mole % of the fatty acid moieties contain two carbon-carbon double bonds.

8. The method according to claim 1, wherein greater than 70 mole % of the fatty acid moieties contain two carbon-carbon double bonds.

9. The method according to claim 1, wherein less than 20 mole % of the fatty acid moieties are saturated.

10. The method according to claim 2, wherein less than 20 mole % of the fatty acid moieties are saturated.

11. The method according to claim 1, wherein the epoxide value of the epoxidized compound is above 7.0, wherein less than 10 mole % of the fatty acid moieties contain three or more carbon-carbon double bonds, wherein greater than 65 mole % of the fatty acid moieties contain two carbon-carbon double bonds, and wherein less than 20 mole % of the fatty acid moieties are saturated.

12. A method comprising:
   (a) providing a pigment;
   (b) providing a fatty (meth)acrylate having an epoxide value of below 0.6, wherein the fatty (meth)acrylate is a product of a process comprising reacting an epoxidized compound selected from the group consisting of epoxidized fatty acid esters, epoxidized triglycerides and mixtures thereof, with an acid selected from the group consisting of acrylic acid, methacrylic acid and mixtures thereof, wherein the epoxide value of the epoxidized compound is above 7.0, wherein the epoxidized compound is an epoxidation product of fatty acid moieties having one or more carbon-carbon double bonds, wherein less than 5 mole % of the fatty acid moieties contain three or more carbon-carbon double bonds, wherein greater than 70 mole % of the fatty acid moieties contain two carbon-carbon double bonds, and wherein less than 20 mole % of the fatty acid moieties are saturated; and (c) combining the pigment and the fatty (meth)acrylate in a liquid carrier medium.

13. A pigment concentrate comprising from 0.1 to 70% by weight of one or more pigments and from 0.1 to 30% by weight of one or more fatty (meth)acrylates according to claim 1.

14. A pigment concentrate comprising from 0.1 to 70% by weight of one or more pigments and from 0.1 to 30% by weight of one or more fatty (meth)acrylates according to claim 2.

15. A pigment concentrate comprising from 0.1 to 70% by weight of one or more pigments and from 0.1 to 30% by weight of one or more fatty (meth)acrylates according to claim 11.

16. A pigment concentrate comprising from 0.1 to 70% by weight of one or more pigments and from 0.1 to 30% by weight of one or more fatty (meth)acrylates according to claim 12.

17. A pigment dispersion comprising from 0.1 to 70% by weight of one or more pigments, from 0.1 to 30% by weight of one or more fatty (meth)acrylates according to claim 1, and from 15 to 85% by weight water.

18. The pigment dispersion according to claim 14, further comprising from 0.1 to 20% by weight of a solvent.

19. The pigment dispersion according to claim 14, further comprising from 0.1 to 20% by weight of a surfactant.

20. A pigment dispersion comprising from 0.1 to 70% by weight of one or more pigments, from 0.1 to 30% by weight of one or more fatty (meth)acrylates according to claim 12, and from 15 to 85% by weight water.

* * * * *